United States Patent [19]

Whittaker

[11] 4,247,129
[45] Jan. 27, 1981

[54] STEERING LINKAGE

[76] Inventor: Donald G. M. Whittaker, 6651 Beech Grove, Ballasalla, Isle of Man, England

[21] Appl. No.: 29,930

[22] Filed: Apr. 13, 1979

[51] Int. Cl.³ .......................................... B62D 17/00
[52] U.S. Cl. .................................................. 280/444
[58] Field of Search ............... 280/442, 443, 444, 445, 280/419, 103, 93, 96, 96.3, 446 B, 457, 422; 172/278, 291, 282; 74/422

[56] References Cited

U.S. PATENT DOCUMENTS

| 2,916,294 | 12/1959 | Quayle | 74/422 |
| 3,509,945 | 5/1970 | Vassberg | 172/291 |
| 3,957,286 | 5/1976 | Goodwin | 280/446 B |
| 3,989,269 | 11/1976 | Rendessey | 280/457 |
| 4,070,031 | 1/1978 | Whittaker | 280/103 |

Primary Examiner—John J. Love
Assistant Examiner—Randall A. Schrecengost
Attorney, Agent, or Firm—Fleit & Jacobson

[57] ABSTRACT

In a steering arrangement in which steering movement is transmitted by a pinion to a rack on a slide mounted in a transverse frame member on a trailer or implement, and from this slide it is transmitted to steerable wheels by appropriate linkage, the steering movement is transmitted from the slide to the steerable wheels by means of a pinion cooperating with a further rack on the slide.

Also described is an adaptor for obtaining steering movement from a tractor drawbar by means of a collar for one jaw bar so as to allow as towing movement to be attached to the drawbar while an arm of the collar has a device for attachment of a steering member.

3 Claims, 3 Drawing Figures

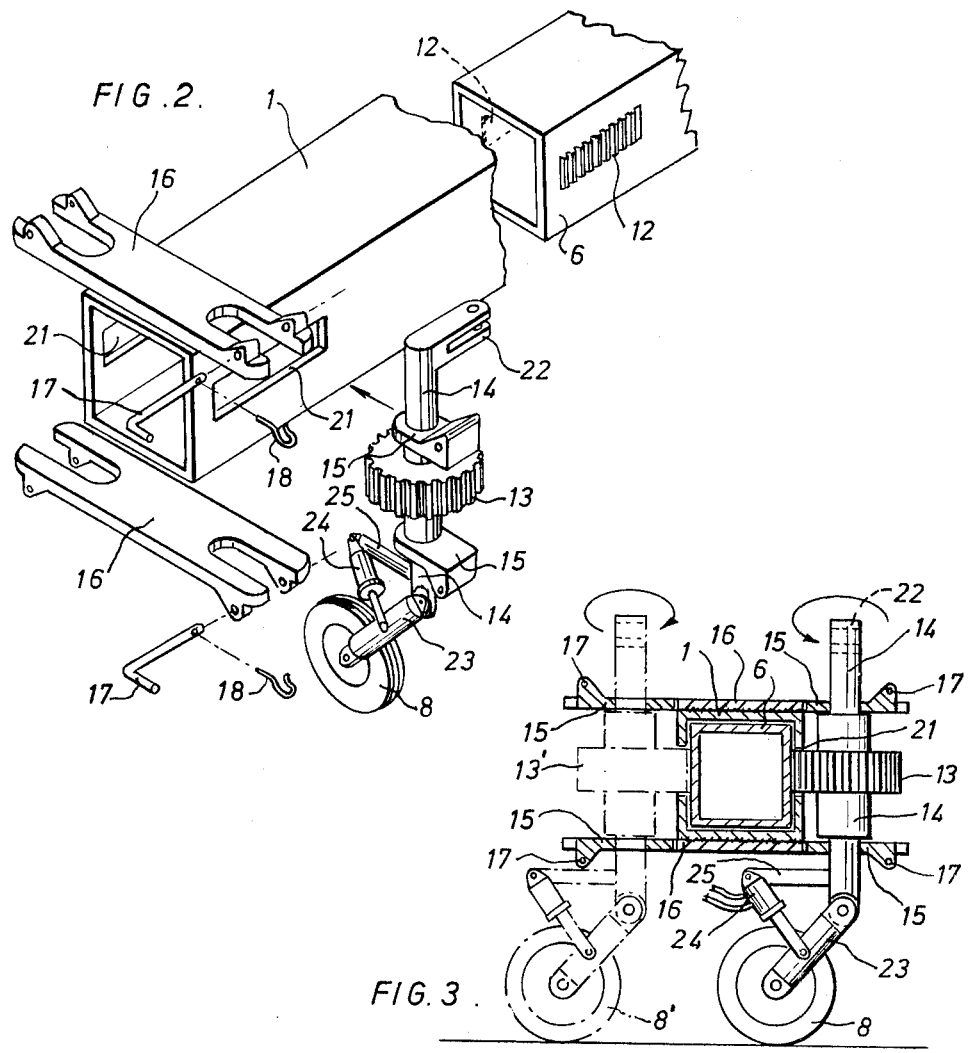
FIG. 2.
FIG. 3.
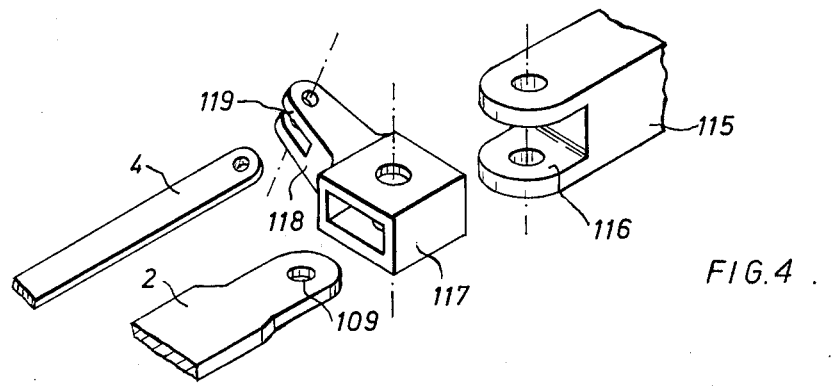
FIG. 4.

STEERING LINKAGE

This invention relates to steering arrangements for trailer vehicles or agricultural implements.

In my patent specification No. 4,070,031, there is described a steering arrangement in which steering movement is transmitted by a pinion to a rack on a slide mounted in a transverse frame member on a trailer or implement, and from this slide it is transmitted to steerable wheels by appropriate linkage.

In accordance with the present invention, I arrange for the steering movement to be transmitted from the slide to the steerable wheels by means of a pinion cooperating with a further rack on the slide.

According to a further aspect of the invention, there is provided an adapter for a tractor drawbar jaw comprising a sleeve or collar adapted to fit over one element of the jaw and to be held in position by a connecting pin, the said sleeve comprising an arm projecting laterally and having at its end a clevis or like connector for pivotally receiving an element such as a steering rod.

The invention will be further described with reference to the accompanying diagrammatic drawings, in which:

FIG. 2 is an exploded view showing details of part of the steering of FIG. 1;

FIG. 3 is a sectional view showing the position of FIG. 2 in assembled relationship; and FIG. 4 is a perspective view of a detail of the attachment of a tractor drawbar connection.

Figure 1:
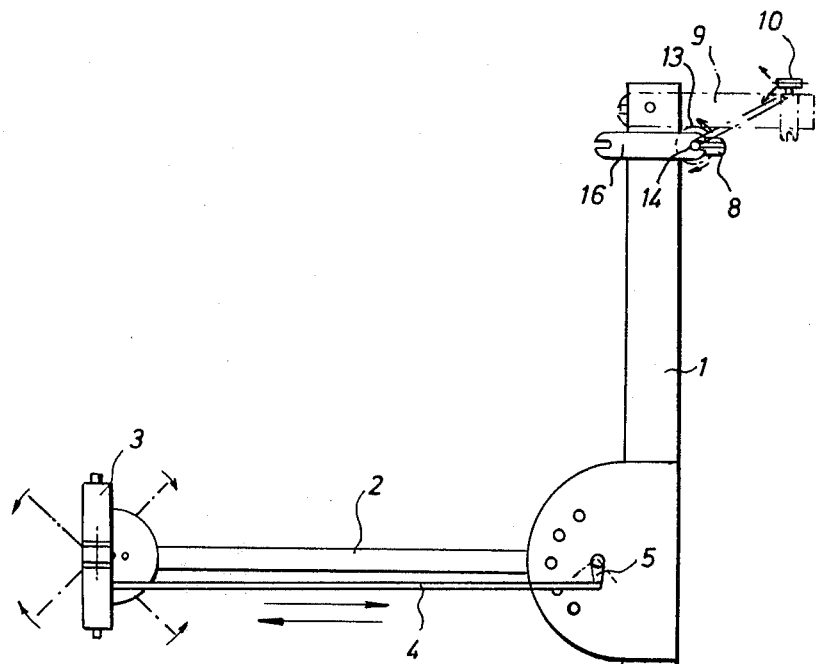
FIG. 1 is a plan view of a steering linkage according to a preferred form of the invention.
Figure 1:
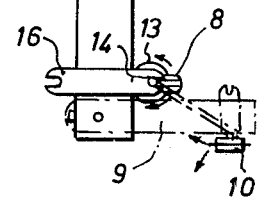

As illustrated in the drawings, there is a transverse frame 1, a longitudinally extending towing member 2 and a cross-member 3 pivotally mounted to the member 2. A link rod 4 is pivotally connected to the cross-member 3 at a point laterally spaced from the pivotal connection to the member 2, and is also pivotally connected to an arm 5 solid with a pinion (not shown) which co-operates with a rack (not shown) formed on a sliding member 6 (see FIGS. 2 and 3) mounted within the transverse frame member 1.

As can be seen from FIG. 1, each end of the transverse frame member supports a steerable wheel 8, and further, optional frame members 9 trail from the transverse frame member 1 and carry further steerable wheels 10. The actual configuration will depend very much on the particular type of implement or trailer to which the invention is to be applied, and FIG. 1 in particular may therefore be taken as very largely diagrammatic.

Turning now to FIGS. 2 and 3, it can be seen that the slide member 6 carries a further pair of racks 12 whereby steering motion imparted via the link rod 4 can be transmitted to the steerable wheels 8 via a pinion 13 solid with the shaft 14. In FIG. 3 there is shown, in phantom, a further steerable wheel 8' in a pinion 13' in engagement with the other rack 12. The point of this is that by mounting the steerable wheel forward of the transverse frame member 1, rather than to the rear of it, the steering action can be reversed if required for further applications. The shaft 14 is rotatably mounted in plates 15 which co-operate with cross plates 16 welded to the transverse frame member 1, and are removably secured to these cross plates 16 by means of pins 17 passing through holes formed in lugs on the cross plates 16 and plates 15. The pins are secured in position by clips 18. When in position, the pinion 13 extends through an aperture 21 in the transverse frame member 1 for engagement with the rack 12. At its upper end, the shaft 14 is provided with a crank 22 which may be used to carry steering movement to the appropriate further steerable wheel 10 is required. Linkage for this purpose is indicated in phantom in FIG. 1.

At its lower end, the shaft 14 carries a pivoted link 23 at the bottom of which the wheel 8 is mounted, and a hydraulic ram 24 is shown as being connected between the link 23 and an arm 25 solid with the shaft 14. This ram enables the height of the trailer or implement to be varied, particularly if a semi-mounted implement is being used.

Various modifications may be made within the scope of the invention. For instance, the plates 15 may have lips or extensions thereon to slide below plates 16 so that when ram 24 is lengthened to raise the frame, the weight will be taken on the lips or extensions rather than the exerting a shear force on the pins 17.

In adapting for use with a drawbar the cross member 3 is omitted and instead the towing member 2 has to be connected to a drawbar jaw 115 as shown in FIG. 4. In order to provide a suitable attachment for the link rod 4 an adapter collar 117 as shown in FIG. 4 may be used.

FIG. 4 is an exploded view showing a standard tractor jaw drawbar 115 having the conventional clevis 116 to receive the towing member 2, and particularly its eye 109 for pivotal connection to the tractor. In order to provide a suitable mounting for the forward end of the link rod 4, an adapter sleeve or collar 117 is placed over the upper jaw of the clevis 116, so as to leave sufficient space below it for the eye 109 to be introduced. It is to be noted that the collar has apertures in its upper and lower faces to provide access for the connecting pin which secures both the eye 109 and the sleeve or collar 117. To the collar 117 there is attached a fixed arm 118 carrying a clevis 119 for attachment of the forward end of the link rod 4.

In certain circumstances the sleeve or collar 117 may need to provide connections for two steering or other members, so the arm 18 may be duplicated, e.g. at the opposite side. This renders the arrangement suitable for pull/pull steering using two steering members such as link rods or chains or cables.

I claim:

1. In a steering arrangement for trailer vehicles or agricultural implements having steerable wheels, comprising a transverse frame member, a slide mounted within the said transverse frame member, a rack on the said slide, a pinion in mesh with the said rack and arranged to receive steering motion as rotation of the pinion to move the rack and slide longitudinally of the transverse frame member; the improvement of further racks on said slide at a forward and rearward face and near both lateral ends of said slide, and further pinions connected to said steerable wheels to impart steering motion thereto consequent upon longitudinal motion of the said slide whereby said further pinions may be selectively positioned ahead of or behind the transverse frame member in mesh with said further racks.

2. A steering arrangement as claimed in claim 1, comprising cross plates extending across the transverse frame member in the region of the said further racks, the said cross plates being adapted to support a further pinion either forwardly or rearwardly of the transverse frame member.

3. A steering arrangement as claimed in claim 1, further comprising a plurality of generally vertical shafts, said further pinions being solid with respective ones of the said generally vertical shafts, a pivoted link mounted on each of the generally vertical shafts, the said steerable wheels being carried by the said pivoted links, and a ram to control the position of the pivoted links in relation to the generally vertical shaft.

* * * * *